(12) United States Patent
Chen et al.

(10) Patent No.: US 8,302,319 B1
(45) Date of Patent: Nov. 6, 2012

(54) METHOD AND APPARATUS FOR ALIGNING AND LEVELING A SERVER RACK RAIL

(75) Inventors: Wen Chen, Shanghai (CN); ZhenDe Fu, Shanghai (CN); Daniel Paul Kelaher, Holly Springs, NC (US); Lei Li, Shanghai (CN); Yu Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/158,864

(22) Filed: Jun. 13, 2011

(51) Int. Cl.
*G01B 11/27* (2006.01)
(52) U.S. Cl. .................................. 33/286; 33/DIG. 21
(58) Field of Classification Search ............... 33/286, 33/613, 645, DIG. 21
See application file for complete search history.

(56) References Cited

U.S. PATENT DOCUMENTS

| | | | |
|---|---|---|---|
| 6,040,787 A | 3/2000 | Durham | |
| 6,293,024 B1 * | 9/2001 | Fiebig et al. | 33/DIG. 21 |
| 6,609,307 B1 | 8/2003 | Haynes et al. | |
| 6,898,860 B2 | 5/2005 | Wu | |
| 6,935,034 B2 | 8/2005 | Malard et al. | |
| 6,944,962 B2 | 9/2005 | Tessel et al. | |
| 7,100,293 B2 | 9/2006 | Kahle | |
| 7,219,437 B2 * | 5/2007 | Dallman | 33/286 |
| D567,685 S | 4/2008 | Burkandt | |
| 7,500,317 B2 | 3/2009 | Steffen et al. | |
| 7,654,006 B1 | 2/2010 | Mooney | |
| 7,815,081 B2 | 10/2010 | Gist et al. | |
| 2001/0037579 A1 | 11/2001 | Akers | |
| 2004/0123473 A1 * | 7/2004 | Malard et al. | 33/286 |
| 2007/0056174 A1 * | 3/2007 | Bascom et al. | 33/286 |
| 2007/0062053 A1 * | 3/2007 | Walser et al. | 33/286 |
| 2009/0120734 A1 | 5/2009 | Barneman et al. | |
| 2009/0143157 A1 | 6/2009 | Ross, Jr. et al. | |
| 2010/0122466 A1 | 5/2010 | Hemingway et al. | |
| 2010/0293798 A1 * | 11/2010 | Wilson et al. | 33/286 |

OTHER PUBLICATIONS

IBM. IP.com, Inc. "Combination of Laser Pointer and Memory Stick." IPCOM000056754D. Feb. 14, 2005.
IBM. IP.com, Inc. "Laser Beam Communication for Adjacent Devices." IPCOM000133802D. Feb. 9, 2006.
IBM. IP.com, Inc. "Leveling Device for Rack Mounting Hardware." IPCOM000135039D. Mar. 27, 2006.
Construction Laser Levels Explained. Engineer Supply, Smart Products, Smarter Shopping. [online] Accessed on: Mar. 1, 2012. Copyright 2006-2009 EngineerSupply. URL:http://www.engineersupply.com/Construction-Laser-Levels-Explained.aspx.
Laser Alignment Tool: Laser Microgage Equipment for Straightness/Linear Measuring. Alignment Applications & Capabilities. [online] Accessed on: Mar. 1, 2012. Copyright 2011 Pinpoint Laser Systems. URL: http://www.pinlaser.com/microCap.html.

\* cited by examiner

*Primary Examiner* — G. Bradley Bennett
(74) *Attorney, Agent, or Firm* — Edward Gecovich; Jason H. Sosa; Matthew C. Zehrer

(57) ABSTRACT

An apparatus for aligning a rail in a computer server rack has a laser transmitter for generating a laser dot. The apparatus has a prism for converting the laser dot into a laser line. The apparatus has a laser lens for projecting the laser line. The apparatus has an elongated bar for positioning the apparatus on a rack post, such that the laser line is projected perpendicular to the rack post.

14 Claims, 6 Drawing Sheets

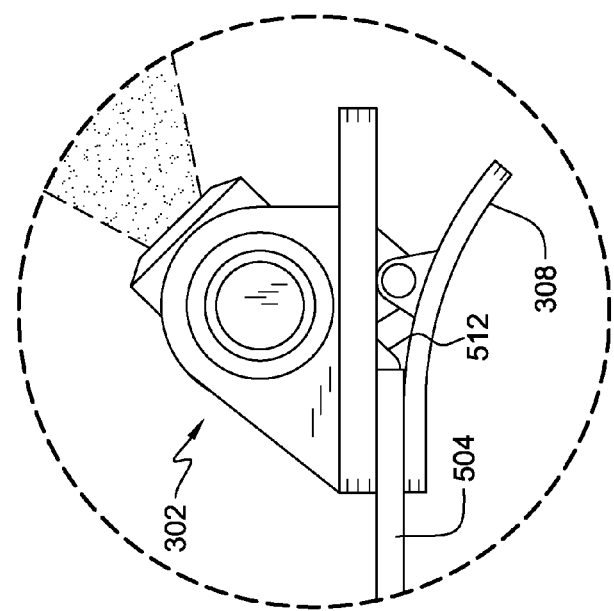
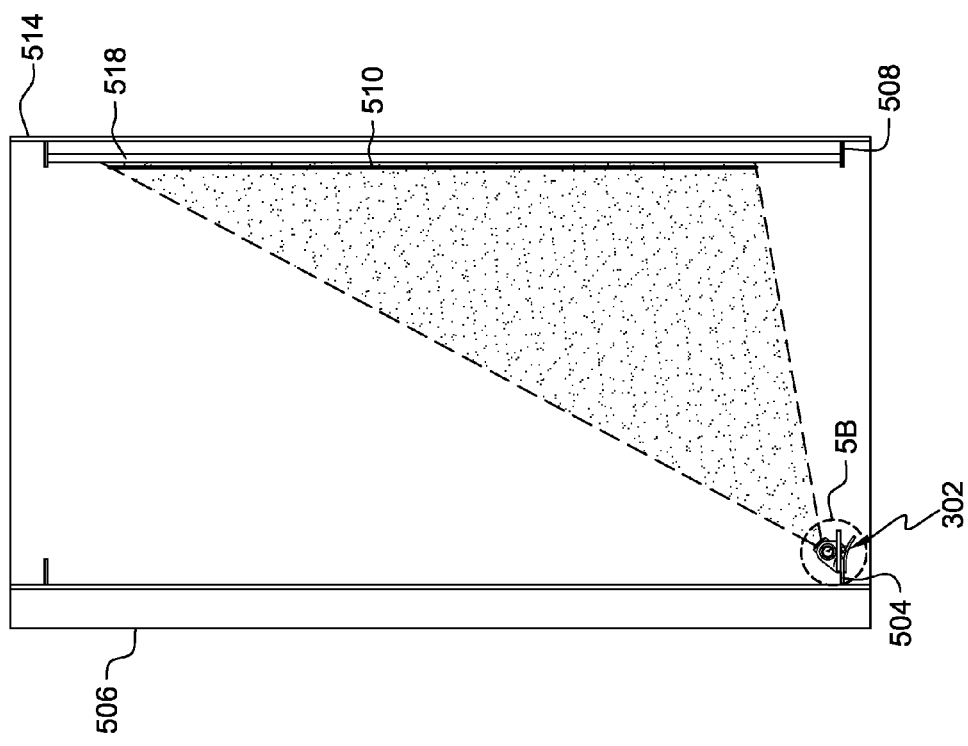

METHOD AND APPARATUS FOR ALIGNING AND LEVELING A SERVER RACK RAIL

FIELD OF THE INVENTION

The present invention relates generally to server racks, and more specifically to installing rails in a server rack.

BACKGROUND

It is known to assemble a rack mounted server system by installing multiple rack mounted servers or blade chassis into a server rack. The rack includes pairs of opposite tracks or rails to slidably receive the rack mounted servers and blade chassis. Before the rack can be used to receive the rack mounted servers and blade chassis, the rails of each pair must be properly aligned, leveled, and attached to the rack. FIG. 1 illustrates a rail 104 attached to a rear rack post 106 and front rack post 108 in rack 102, according to the prior art. An installer secures rail 104 to rack 102 by lining two rail mounting holes (not shown) on a first end 112 of rail 104 with two of a plurality of rack mounting holes 116 on a front rack post 108 of rack 102. The installer then inserts mounting screws 118A-B through the two rail mounting holes (not shown) and the two of the plurality of rack mounting holes 116. The installer then repeats the process for a second end 110 of rail 104 on rear rack post 106 of rack 102.

Rail mounting holes on a front end of a rail, however, may not line up the same way with rack mounting holes on a front side of a rack as do rail mounting holes on a back end of the rail line up with rack mounting holes on a back side of the rack, as illustrated in FIGS. 2A and 2B. FIG. 2A illustrates a back side 204 of a rail 202, secured to rack 208 by back side mounting screws 210A-B. FIG. 2B illustrates a front side 206 of rail 202 secured to rack 208 by front side mounting screws 210C-D. Back side mounting screws 210A-B, however, do not line up evenly with front side mounting screws 210C-D. For example, back side mounting screws 210A-B may be positioned further apart, as compared to front side mounting screws 210C-D which may be positioned closer together, as illustrated in FIGS. 2A and 2B. Also, in order to level the rail, back side mounting screw 210A may need to be aligned with a mounting hole on rack 208 at a higher point, relative to the top of rack 208, as compared to a mounting hole on rack 208 that front side mounting screw 210C needs to be aligned with. Thus, to properly align and level a rail in a rack, an installer cannot simply rely on the selected front mounting holes of a rack as a reference point to determine the rear mounting holes of the rack. Instead, the installer must visually level and align the rail.

Visually leveling and aligning the rail, however, can lead to mistakes. An installer may accidentally install the rail at a slight angle, rather than on a horizontal level plane, by choosing the wrong mounting hole on the rack. The installer would then need to go back and adjust the rail to a horizontal level, which is time consuming. Further, an installer may not realize that the rail is not horizontally level until after he mounts a server on the rail. This further inconveniences the installer and further consumes his time since the installer must remove the server before adjusting the rail.

A known rail includes a bubble level in the middle of the rail to help the installer determine when the rail is on a horizontal level. However, if the floor and therefore, the server, are not level, the bubble level may be misleading if an installer attempts to secure the rail parallel to a server base. In addition, it is not cost effective to include a bubble level on every rail.

Also, a back side of rack can be poorly lit and crowded with cables which can make it more challenging for an installer to properly level and align a rail in a rack visually.

An object of the present invention is to enable an installer to efficiently and reliably install a rail in a rack, parallel to a server base.

SUMMARY

In a first embodiment of the present invention, an apparatus for aligning a rail in a computer server rack has a laser transmitter for generating a laser dot. The apparatus has a prism for converting the laser dot into a laser line. The apparatus has a laser lens for projecting the laser line. The apparatus has an elongated bar for positioning the apparatus on a rack post, such that the laser line is projected perpendicular to the rack post.

In a second embodiment of the present invention, there is a method for installing a rail in a computer server rack. The method comprises securing an alignment apparatus on a rack post on a first inner side of a rack. The alignment apparatus includes a laser transmitter and a laser lens and is positioned to project a laser line, via the laser lens, onto an opposite, inner side of the rack. The method comprises powering on the laser transmitter to project a laser line. The method comprises securing the rail to a front rack post and a rear rack post on the opposite, inner side of the rack, such that the rail is level with the projected laser line.

BRIEF DESCRIPTION OF THE SEVERAL VIEWS OF THE DRAWINGS

FIG. 5A illustrates a top view of the alignment apparatus of FIG. 3 secured to a left rack post in a rack, according to one embodiment of the present invention.

FIG. 5B illustrates a close-up top view of the alignment apparatus of FIG. 3 secured to a left rack post in a rack, according to one embodiment of the present invention.

DETAILED DESCRIPTION

Figure 1:
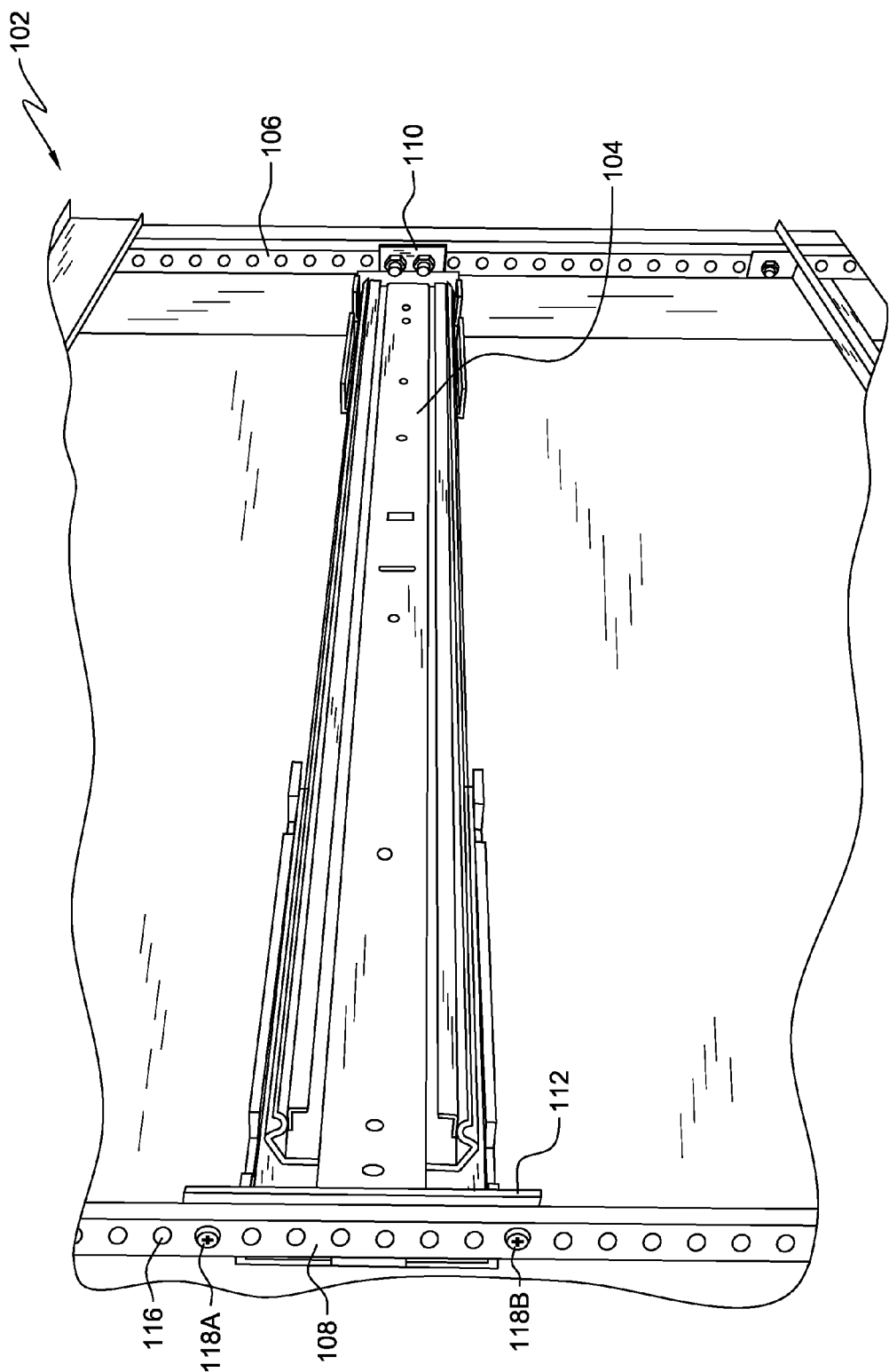
FIG. 1 illustrates a rail attached to a rack, according to the prior art.
Figure 2B:
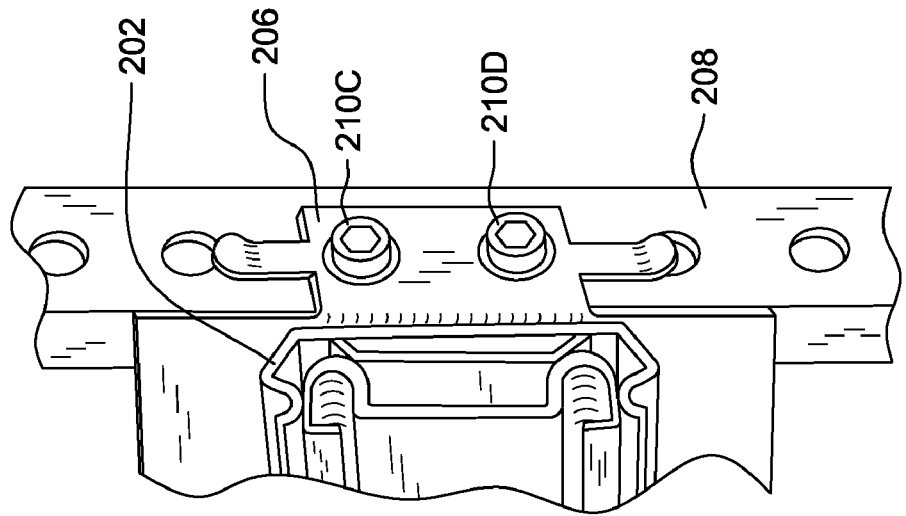
FIG. 2B illustrates a front side of a rail secured to rack by front side mounting screws, according to the prior art.
Figure 2A:
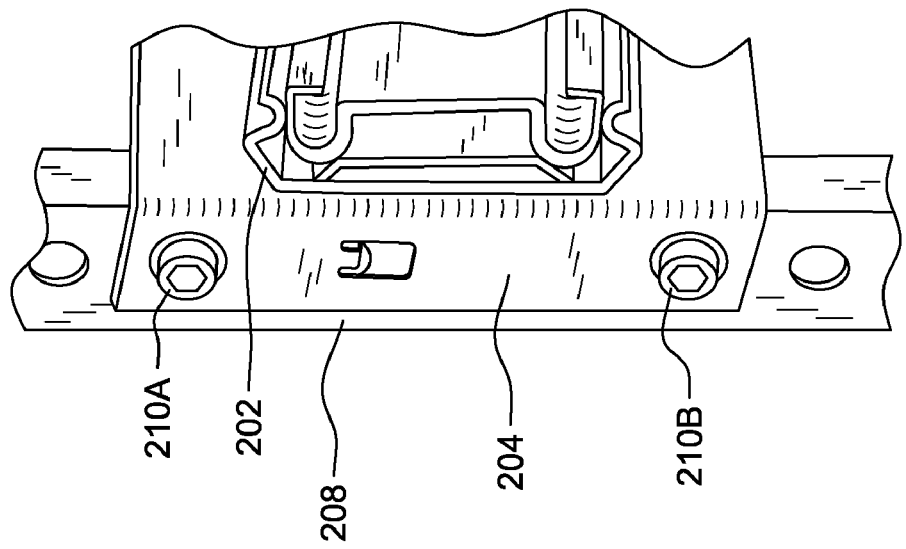
FIG. 2A illustrates a back side of a rail, secured to a rack by back side mounting screws, according to the prior art.
Figure 3:
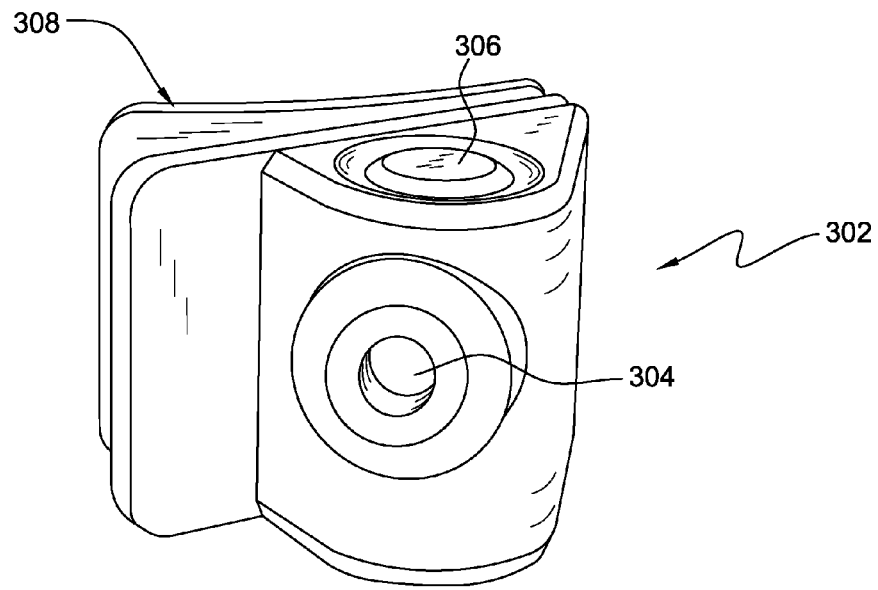
FIG. 3 illustrates an alignment apparatus for aligning and leveling a rail on a rack, according to one embodiment of the present invention.

The present invention will now be described in detail with reference to the figures. FIG. 3 illustrates an alignment apparatus 302 for aligning and leveling a rail on a rack, according to one embodiment of the present invention. Alignment apparatus 302 has a laser lens 304 for emitting a laser light. A power button 306 activates alignment apparatus 302 to emit a laser light via laser lens 304. Power button 306 may be a push-button, a switch, or other similar device. Laser lens 304 emits a laser light in the form of a horizontal line when projected onto a surface. When projected onto a region of a rack intended to receive a rail, the horizontal laser line serves a reference guide for an installer to accurately align and install the rail.

Alignment apparatus 302 has a clip 308 to secure alignment apparatus 302 to a rack post in a rack. In another embodiment, alignment apparatus 302 has a magnet (not shown) for securing alignment apparatus 302 to a rack post. In yet another embodiment, alignment apparatus 302 has mounting holes (not shown) to enable alignment apparatus 302 to be secured to a rack post using mounting screws. Thus, alignment apparatus 302 can be easily adjusted and moved to different heights on the rack post and to different sides of the rack.

Figure 4:
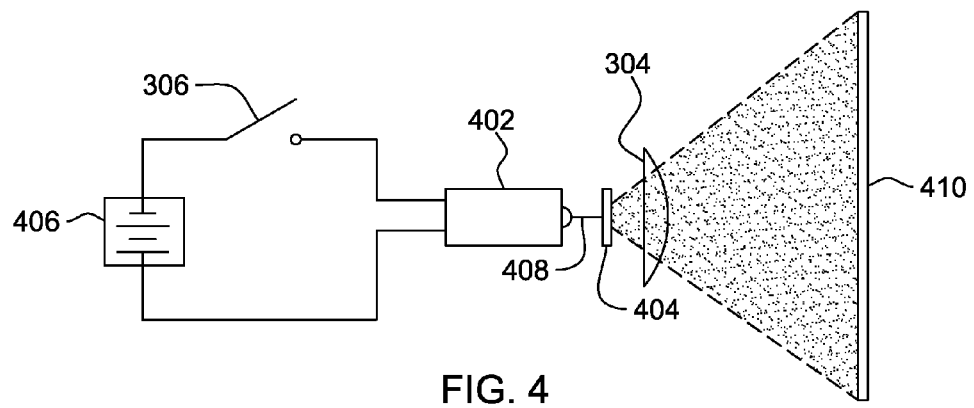
FIG. 4 illustrates the internal components of the alignment apparatus of FIG. 3, according to one embodiment of the present invention.

FIG. 4 illustrates the internal components of alignment apparatus 302 of FIG. 3, according to one embodiment of the present invention. Alignment apparatus 302 has a laser transmitter 402 for generating a laser light 408 in the form of a dot when projected onto a surface. Laser transmitter 402 can be any suitable device known to transmit a laser dot. Alignment apparatus 302 has a prism 404 for converting the laser dot 408 generated by laser transmitter 402 into a laser line 410. Alignment apparatus 302 projects the laser line 410 onto a surface via laser lens 304.

Alignment apparatus 302 is powered by battery 406. Battery 406 is electrically coupled in series with laser transmitter 402 and power button 306. When power button 306 is in a closed state ("on"), battery 406 provides power to laser transmitter 402 which generates laser light 408. When power button 306 is in an open state ("off"), no power is provided to laser transmitter 402, and therefore, laser transmitter does not generate laser light 408.

FIG. 5A illustrates a top view of alignment apparatus 302 secured to a left rack post 504 in rack 506, with clip 308, according to one embodiment of the present invention. Although the figure illustrates alignment apparatus 302 secured to left rack post 504, it should be understood that alignment apparatus 302 can be similarly secured to right rack post 508 as well. When powered on, alignment apparatus 302 projects a laser line 510 onto right side wall 514 of rack 506, perpendicular to the axis on which alignment apparatus 302 is secured. An installer can then use the laser line 510 to accurately align and install a rail 518 in rack 506.

FIG. 5B is a close-up of top view of alignment apparatus 302 secured to left rack post 504 in rack 506, with clip 308, according to one embodiment of the present invention. Alignment apparatus 302 has an elongated bar 512 for guiding alignment apparatus 302 into a position on rack post 504 such that laser line 510 is projected onto right side wall 514 of rack 506 perpendicular to rack post 504, or level to rack 506.

Figure 5C:
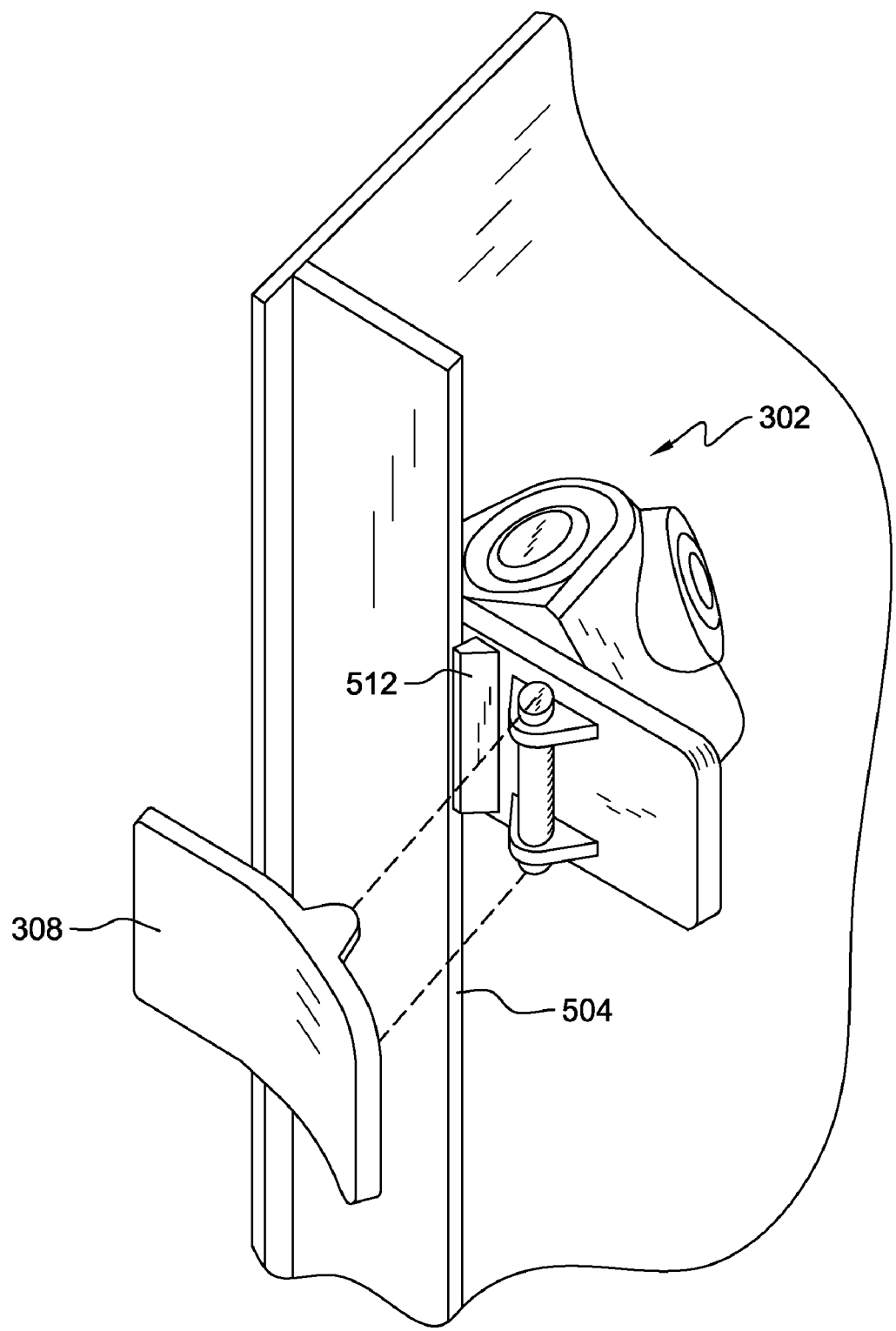
FIG. 5C illustrates a close-up side view of the alignment apparatus of FIG. 3 secured to a left rack post in a rack, according to one embodiment of the present invention.

FIG. 5C illustrates a close-up side view of alignment apparatus 302 secured to left rack post 504 in rack 506, according to one embodiment of the present invention. A bottom portion of clip 308 has been removed in the illustration to better illustrate elongated bar 512. Elongated bar 512 is perpendicular to laser line 510. Thus, when elongated bar 512 is positioned flush against rack post 504, parallel to rack post 504, laser line 510 will project perpendicular to rack post 504, or level to rack 506.

Figure 6C:
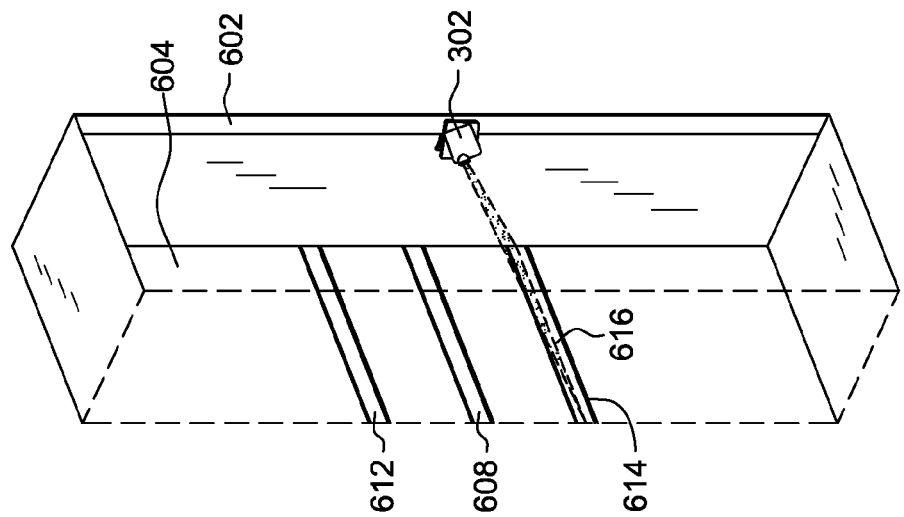
FIG. 6C illustrates the alignment apparatus of FIG. 3 secured to a rack post and tilted slightly downwards, according to one embodiment of the present invention.
Figure 6B:
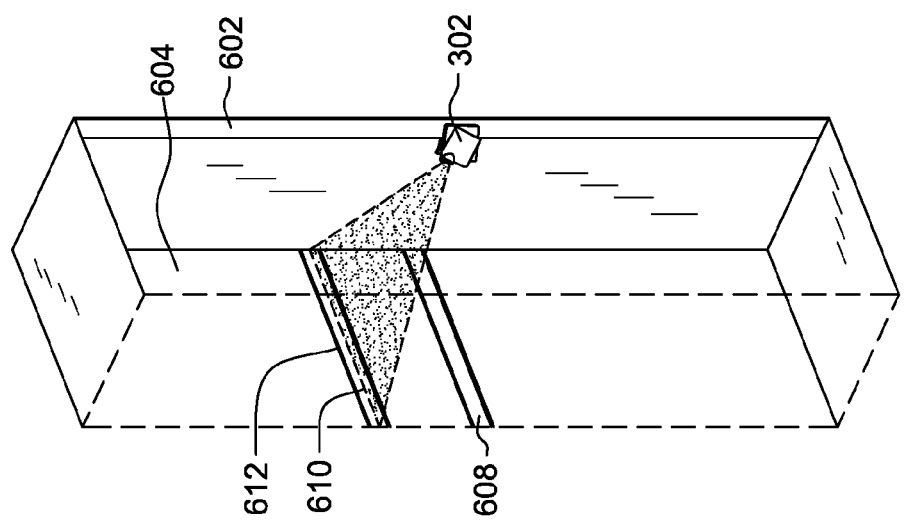
FIG. 6B illustrates the alignment apparatus of FIG. 3 secured to a rack post and tilted slightly upwards, according to one embodiment of the present invention.
Figure 6A:
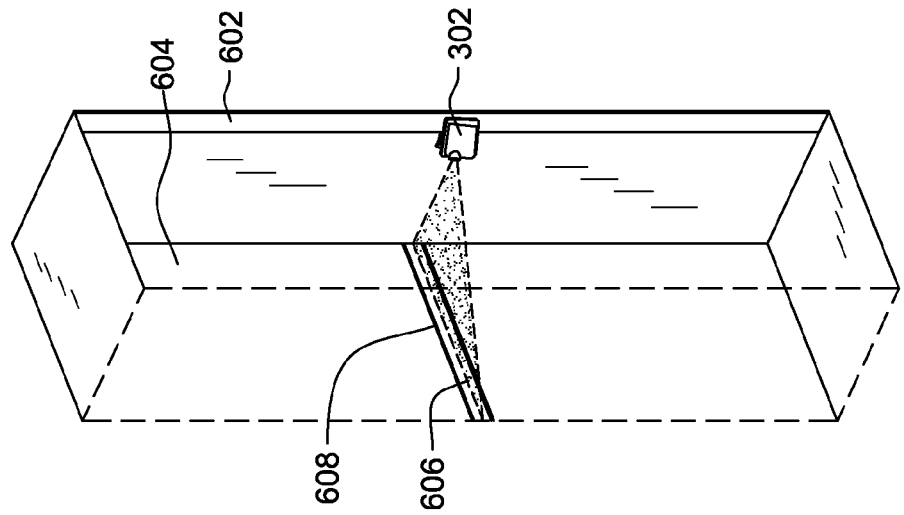
FIG. 6A illustrates the alignment apparatus of FIG. 3 secured to a rack post, according to one embodiment of the present invention.

FIG. 6A illustrates alignment apparatus 302 secured to a rack post 602, according to one embodiment of the present invention. Alignment apparatus 302 projects a laser line 606 horizontally onto opposite rack wall 604 to serve as a guide for leveling and aligning rail 608. If an installer desires to install a rail at a higher position on opposite rack wall 604 as compared to the current position of alignment apparatus 302, alignment apparatus can easily be moved up on rack post 602 so that laser line 606 is projected horizontally at the desired level. Alternatively, alignment apparatus 302 is rotatable. This allows an installer to adjust the position of the laser line 606 to accommodate an alternate rail install height without moving alignment apparatus 302 on rack post 602. In an example embodiment, the rotation axis of alignment apparatus 302 is perpendicular to rack post 602. Thus, after rotating alignment apparatus 302, the angle of laser line 606 changes but laser line 606 will always stay perpendicular to rack post 602.

FIG. 6B illustrates alignment apparatus 302 rotated slightly upwards to project laser line 610 on rack 604 at a level slightly higher than rail 608. The adjusted location of laser line 608 serves as a guide for leveling and aligning rail 612 at a higher position on rack 604 as compared to rail 608.

FIG. 6C illustrates alignment apparatus 302 rotated slightly downwards to project laser line 614 on rack 604 at a level slightly lower than rail 608. The adjusted location of laser line 614 serves as a guide for leveling and aligning rail 616 at a lower position on rack 604 as compared to rail 608.

The method for aligning and leveling a rail on a rack, according to one embodiment of the present invention is as follows. An installer positions an alignment apparatus 302 on a rack post on a first side of a rack at a desired mounting location. Next, the installer secures the alignment apparatus 302 to the rack post. For example, the installer may clip the alignment apparatus 302 to the rack post with a clip. Alternatively, the installer may secure the alignment apparatus 302 to the rack post with a magnet. Alternatively, the installer may secure the alignment apparatus 302 to the rack post using a mounting screw and inserting the mounting screw into a mounting hole of the alignment apparatus 302 and into a mounting hole of the rack post.

In securing the alignment apparatus 302 to the rack post, the installer positions alignment apparatus 302 on the rack post so that elongated bar 512 is flush against rack post 504, parallel to rack post 504. Since elongated bar is perpendicular to a laser line projected by alignment apparatus 302, laser line will in turn be perpendicular to the rack post, and therefore level to the rack.

Next, the installer powers on a laser transmitter of the alignment apparatus 302 to project a laser line on an opposite side of the rack. In an example embodiment, the installer may rotate the alignment apparatus 302 to adjust the position of the laser line on the opposite side of the rack. For example, if after powering on the laser transmitter the laser line is projected slightly above the desired mounting location on the rack, the installer may rotate the alignment apparatus 302 slightly downward to adjust the position of the laser line accordingly.

Next, the installer secures the server rack rail to rack posts on the opposite side of the rack, making sure that the rail is level with the projected laser line. Since the laser line is level with the rack, aligning the rail with the laser line will ensure that the rail is also level with the rack.

The description above has been presented for illustration purposes only. It is not intended to be an exhaustive description of the possible embodiments. One of ordinary skill in the art will understand that other combinations and embodiments are possible.

What is claimed is:

1. An apparatus for aligning a rail in a computer server rack, the apparatus comprising:
   a laser transmitter for generating a laser dot;
   a prism for converting the laser dot into a laser line;
   a laser lens for projecting the laser line; and
   an elongated bar for positioning the apparatus on a rack post, such that the laser line is projected perpendicular to the rack post.

2. The apparatus of claim 1, wherein the elongated bar is perpendicular to the laser line.

3. The apparatus of claim 1, wherein the elongated bar comprises a flat end for making flush contact with the rack post.

4. The apparatus of claim 1, further comprising a fastening means for fastening the apparatus to the rack post.

5. The apparatus of claim 4, wherein the fastening means comprises a clip.

6. The apparatus of claim 5, wherein the fastening means comprises a magnet.

7. The apparatus of claim 5, wherein the fastening means comprises a mounting hole for receiving a mounting screw.

8. The apparatus of claim 1, wherein the laser lens is rotatable on a rotation axis perpendicular to the rack post.

9. A method for installing a rail in a computer server rack, the method comprising the steps of:
   securing an alignment apparatus on a rack post on a first inner side of a rack, the alignment apparatus including a laser transmitter and a laser lens and being positioned to project a laser line, via the laser lens, onto an opposite, inner side of the rack;
   powering on the laser transmitter to project a laser line; and
   securing the rail to a front rack post and a rear rack post on the opposite, inner side of the rack, such that the rail is level with the projected laser line.

10. The method of claim 9, wherein the step of securing an alignment apparatus on a rack post comprises positioning the alignment apparatus on the rack post so that an elongated bar of the alignment apparatus fits flush against the rack post.

11. The method of claim 9, wherein the step of securing an alignment apparatus on a rack post comprises clipping the alignment apparatus to the rack post with a clip.

12. The method of claim 9, wherein the step of securing an alignment apparatus on a rack post comprises mounting the alignment apparatus to the rack post with a magnet.

13. The method of claim 9, wherein the step of securing an alignment apparatus on a rack post comprises inserting a mounting screw into a mounting hole of the alignment apparatus and into a mounting hole of the rack post.

14. The method of claim 9, further comprising the step of rotating the laser lens to adjust a position of the laser line on the opposite, inner side of the rack.

\* \* \* \* \*